Nov. 3, 1936.    J. R. OISHEI ET AL    2,059,481
WINDSHIELD CLEANING SYSTEM
Filed May 4, 1933
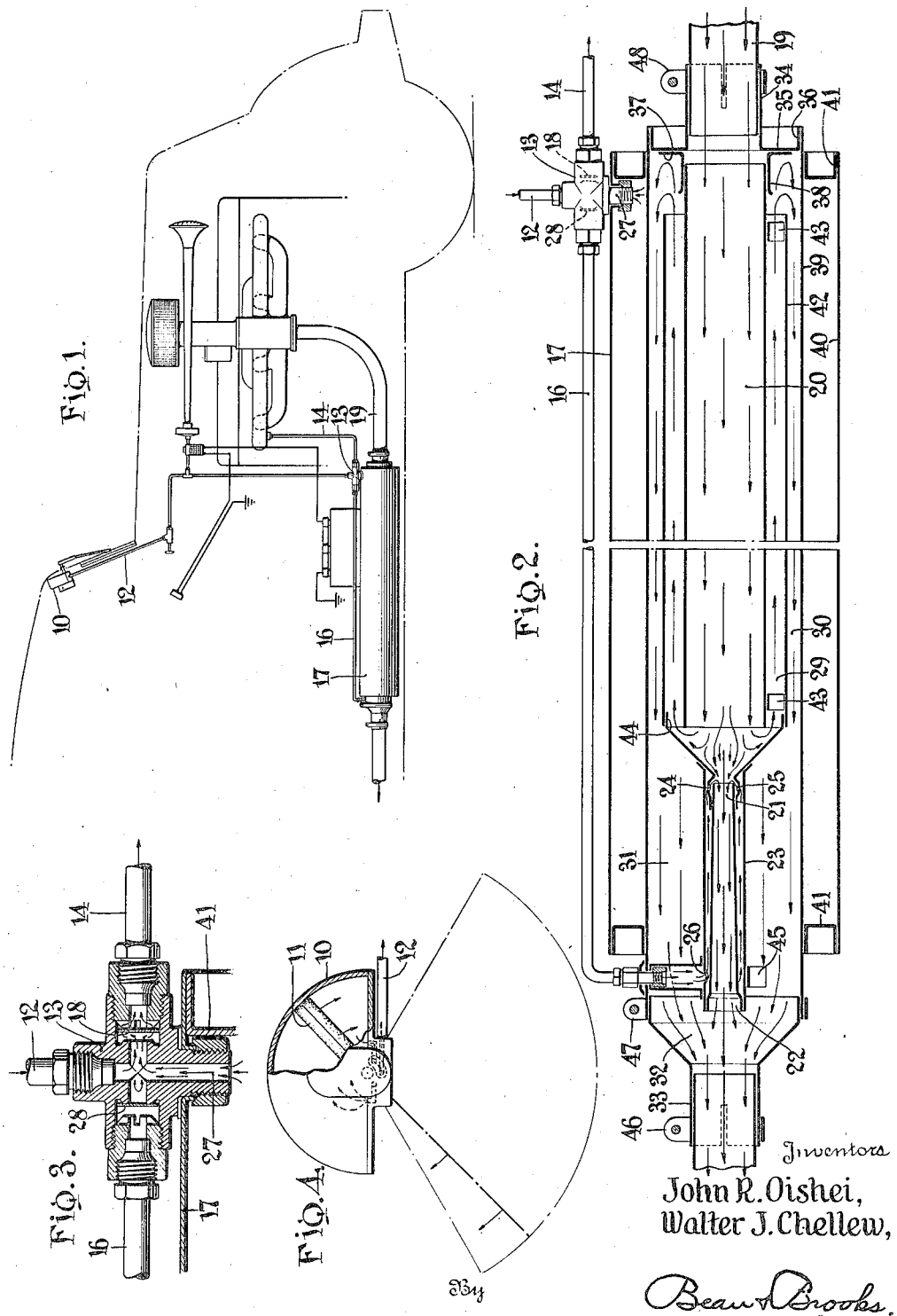
Inventors
John R. Oishei,
Walter J. Chellew,
By Bean Brooks
Attorneys Patented Nov. 3, 1936

2,059,481

UNITED STATES PATENT OFFICE 2,059,481

WINDSHIELD CLEANING SYSTEM

John R. Oishei and Walter J. Chellew, Buffalo, N. Y., assignors to Trico Products Corporation, Buffalo, N. Y.

Application May 4, 1933, Serial No. 669,405

3 Claims. (Cl. 60—60)

This invention relates to an automobile accessory system and to means for securing effective and substantially continuous operation when desired of accessories to the automobile, such as windshield cleaners and the like.

In the case of automatic windshield wipers of the so-called suction type in which a piston or movable member which actuates the windshield wiper on the windshield glass is caused to move by the pressure of the atmospheric air due to the withdrawal of air from the side of the piston other than that to which the atmospheric air is applied, for over a decade in practical operation drivers and motorists have found that at certain throttle positions the speed of movement of the windshield wiper on the glass is materially lessened and that in many instances when sudden acceleration of the speed of the car is effected the windshield wiper is brought to a stop. This sometimes happens when there exists the necessity for the utmost in clear vision, as when accelerating to pass another automobile going in the same direction. A similar disability has applied in the case of the so-called vacuum operated horns in vogue within the past few years, as in accelerating to pass another automobile going in the same direction, when there is the necessity then or immediately there-following for effective operation of the horn, the acceleration of the engine has so reduced the vacuum condition present in the intake manifold as to make the sounding operation of the horn ineffective.

An object of the present invention is to utilize other normal functions and characteristics of the internal combustion engine of an automobile for providing at all times effective and ample operation of the automatic air-operated accessories such as windshield wipers; and further to provide automatic selective means which will insure that the normal function of the automobile engine which is the better adapted at the particular time for exerting its influence upon the windshield wiper will be placed in communication therewith.

These and other objects will appear in the accompanying specification and claims.

In the accompanying drawing:

Fig. 1 is a fragmentary diagrammatic elevation of an accessory system as incorporated in a motor vehicle;

Fig. 2 is a longitudinal section, on a larger scale, of a muffler structure included in the system;

Fig. 3 is a vertical section of valved connections for fluid control in the system; and Fig. 4 is a fragmentary view of a windshield cleaner.

In the drawing, 10 designates an automatic windshield wiper having a piston 11 which is adapted to receive alternately on the sides thereof applications of atmospheric air and on the side opposite to which atmospheric air is being applied to be subject to a vacuum or suction influence. This automatic windshield wiper may be of the type illustrated and described in Letters Patent No. 1,849,327 to Hueber or No. 1,674,056 to Oishei et al., or of other desired form operating on the same general principle. 12 designates a suction line extending from said wiper to the T connection 13. One branch 14 of this T connection extends to the intake manifold 15 of the internal combustion engine. The other branch 16 of the T connection extends to a vacuum tank 17. 18 designates a valve interposed at a suitable point between the vacuum tank and the intake manifold and preferably seating toward the vacuum tank, whereby when the pressure condition in the vacuum tank is lower than the pressure condition normally obtaining in the intake manifold, the valve will be seated and the windshield wiper or device will be placed under the influence of the condition pertaining in the vacuum tank. The vacuum tank 17 is preferably constructed to envelop a portion of the exhaust system of the vehicle engine and may, as illustrated, be constructed as a part of the muffler system for the exhaust gases of the engine.

In the form of the device shown, 19 designates an exhaust pipe for the gases from the exhaust manifold of the internal combustion engine. This exhaust pipe 19 is in communication with a passage 20 which in turn is in communication with a restricted passage 21, which passage flares outwardly from its point of restriction to the point indicated at 22. 23 designates a sleeve enclosing the restricted portion and 24 and 25 designate openings extending from the space enclosed by said sleeve to the restricted portion. The space formed by the sleeve is in communication through pipes or passages 26 and 27 with the vacuum tank. 28 designates a valve interposed between the space adjacent the restricted portion and the vacuum tank. This valve is arranged to open away from the vacuum tank, whereby when the suction influence exerted on the valve by the space around the restricted portion of the muffler is greater than the suction influence in the vacuum tank, the tank, and consequently the windshield wiper or the like, will be under influence from the muffler. When the vacuum influence in the muffler is less than that in the tank or in the manifold, the windshield wiper will be under influence fro mthe intake manifold.

In the operation of the device so far described, the main stream of the exhaust gases, in passing through the exhaust pipe, enters the restricted portion in the muffler. Due to the restriction, the velocity of the gas must be increased in order for the smaller area to carry the same volume as the larger, but in order to accelerate the gas to the higher velocity work has to be done on it and the energy for this is furnished by loss of static pressure. There is a transformation of energy from potential or pressure form to kinetic energy. So far, this does not involve any sub-atmospheric pressures. But, in the tapered expansion chamber the velocity is gradually retarded and the kinetic energy possessed by the gas at its high velocity is converted back into potential energy before it is discharged at atmospheric pressure.

Therefore, if static pressure is less when gas is at high velocity and rises to atmosphere as gas velocity is retarded, then the static pressure at the high velocity point must be subatmospheric.

The result is that a depression or suction is created due to the lowered pressures of the gases at the point of restriction, tending to draw air into the restricted portion, which action, if the system is open to the vacuum tank, exhausts the air in the vacuum tank or any which may tend to pass therethrough.

By introducing this restriction into the main path of travel of the exhaust gases, at engine speeds and conditions of density in the intake manifold in which there is not sufficient subatmospheric pressure to induce satisfactory operation of the windshield wiper, the pressure condition obtaining in the exhaust line from the engine can be satisfactorily used to create a subatmospheric pressure condition which will provide ample power for the operation of the accessory device.

In our experiments we have ascertained that with an exhaust pipe of 1¾" in diameter, a restriction substantially ½" in internal diameter at its smallest point will achieve this result and will during low volume discharge by the exhaust system of the internal combustion engine apparently discharge a major portion of the exhaust gases.

In order to take care of the excess exhaust gases passing through the system and in particular to take care of the greater volume of exhaust gases passing through at higher engine speeds, we provide means for by-passing such excess portion of the gases.

29 designates one reach of the by-pass passages, the arrows indicating the direction of flow of the gases, and 30 designates the other reach. These excess exhaust gases as they travel rearwardly through the passage 29, and again forwardly through the passage 30, pass out to the enlarged space or passage 31 and thence to the space 32 where they mingle with the gases discharged through the end of the restricted tube and thence outwardly through pipe 33.

In the desirable form of the invention illustrated herein the exhaust pipe 19 is inserted into a collar 34, this collar having laterally and longitudinally turned flanges as at 35 and 36. The flange 35 is welded to the flange 37 of an angle piece, the longitudinal portion 38 of which is welded to the pipe 20. The longitudinally extending portion 36 of the collar is welded to the muffler jacket 39 and the outer shell 40 of the vacuum tank is welded to the jacket 39 by means of the angle pieces 41. The cylinder 42 defining the by-pass passages is held in place by means of spacers 43 and is welded or secured as at 44 to the restricted passage tube. 45 defines strut members secured and spacing the sleeve 23 from the muffler shell. 46, 47 and 48 indicate brackets for securing the exhaust pipes and the muffler assembly to the vehicle.

We have found that the provision of means for increasing the velocity and lowering the pressure of the exhaust gases in their direct path of movement or of a substantial portion of such gases in such movement, results in a system which will not become unworkable due to accumulations of carbon or other matter deposited therein and transforms the gradually increasing volumes and pressures of the exhaust gases as the speed of the engine and consequently the vehicle, is increased, into increasingly lowered pressures for the operation of the windshield wiper. This provides a system wherein during certain speeds of the vehicle engine, such for example as idling or low speeds, where the pressure in the intake manifold of the vehicle engine is sufficiently low and the pressure in the exhaust from the engine is relatively low, the windshield wiper will operate in response to the condition in the intake manifold; that as the engine speeds up or is accelerated and the condition in the intake manifold more nearly approaches atmospheric pressure, the greater pressure in the exhaust end of the system provides a greater lowering of pressure for operation of the windshield wiper or the like.

We claim:

1. The combination with an internal combustion engine having a suction producing means providing variable subatmospheric pressures, an exhaust conduit leading from the engine, a muffler incorporated in the structure of the exhaust conduit directly in the path of the exhaust gases discharged from the engine, said muffler having suction producing means incorporated in the muffling structure thereof to provide variable subatmospheric pressures and responsive to the flow of exhaust gases therethrough to produce the suction, said muffler having a sound deadening chamber formed as a part of the muffling structure, outlet control means incorporated with the chamber in communication with both of said suction producing means and responsive to the lower of the pressures in the two suction producing means to provide open communication from such lower pressure into the sound deadening chamber, and subatmospheric pressure dispensing means connected to the chamber and consequently to the lower of the subatmospheric pressures of the two suction producing means.

2. The combination with an internal combustion engine having suction producing means providing variable subatmospheric pressures, an exhaust conduit leading from the engine, a muffler incorporated in the structure of the exhaust conduit directly in the path of the exhaust gases discharged from the engine, said muffler having suction producing means incorporated in the muffling structure thereof to provide variable subatmospheric pressures and responsive to the flow of exhaust gases therethrough to produce the suction, said muffler having a sound deadening chamber formed as a part of the muffling structure, outlet control means incorporated with the chamber in communication with both of said suction producing means and responsive to the lower of the pressures in the two suction producing means to provide open communication from such lower pressure into the sound deadening chamber, and means constantly communicating with the chamber and consequently with the lower of the subatmospheric pressures of the two suction producing means for operating a differential pressure responsive device.

3. The combination with a muffler having an engine exhaust conduit incorporated in the muffling structure thereof, suction producing means incorporated in the muffling structure of the muffler directly in the path of the exhaust conduit to provide variable subatmospheric pressures in reponse to the flow of exhaust gases therethrough, said muffler having a sound deadening chamber formed as a part of the muffling structure, second means for connecting said sound deadening chamber with variable subatmospheric pressure space of the engine intake, said sound deadening chamber including outlet control mechanism having communicating connection with said suction producing means and with said second means and responsive to the lower of the pressures through the two means to provide communication from such lower pressure into the sound deadening chamber, and means communicating with the chamber and consequently with the lower of the subatmospheric pressures of the two suction producing sources for operating a differential pressure responsive device.

JOHN R. OISHEI.
WALTER J. CHELLEW.